US008685110B2

(12) United States Patent
Dowens et al.

(10) Patent No.: US 8,685,110 B2
(45) Date of Patent: Apr. 1, 2014

(54) SYSTEM AND METHOD FOR SECURING A COMPUTER SYSTEM

(75) Inventors: John P Dowens, Red Bank, NJ (US); Paul James Fellingham, Holmdel, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 617 days.

(21) Appl. No.: 12/277,746

(22) Filed: Nov. 25, 2008

(65) Prior Publication Data

US 2010/0132054 A1  May 27, 2010

(51) Int. Cl.
*G06F 21/88* (2013.01)
(52) U.S. Cl.
CPC ..................................... *G06F 21/88* (2013.01)
USPC .......................................................... 726/35
(58) Field of Classification Search
CPC ............................ G06F 21/88; G06Q 20/3674
USPC ................................................ 726/35, 26–30
See application file for complete search history.

(56) References Cited

U.S. PATENT DOCUMENTS

| 5,675,321 | A | 10/1997 | McBride |
| 6,011,473 | A | 1/2000 | Klein |
| 6,087,937 | A | 7/2000 | McCarthy |
| 6,294,995 | B1 | 9/2001 | Patterson |
| 6,683,528 | B2 | 1/2004 | Barrus et al. |
| 7,135,971 | B2 | 11/2006 | Kim |
| 7,890,089 | B1 * | 2/2011 | Fujisaki ..................... 455/414.2 |
| 2003/0074577 | A1 * | 4/2003 | Bean et al. .................... 713/200 |
| 2007/0199047 | A1 * | 8/2007 | Gibart et al. ...................... 726/2 |
| 2009/0049311 | A1 * | 2/2009 | Carlson et al. ................ 713/193 |
| 2009/0146846 | A1 * | 6/2009 | Grossman ..................... 340/988 |

* cited by examiner

*Primary Examiner* — Brandon Hoffman
*Assistant Examiner* — Anthony Brown
(74) *Attorney, Agent, or Firm* — Wolff & Samson, PC

(57) ABSTRACT

A secured computer system includes a communication interface and an intrusion detection module. The computer system may be portable and configured for wireless communication with a user of the system. The user may activate and configure an alarm monitor, which may be triggered by motion of the computer system. If the triggered alarm is not deactivated, an alarm sequence is activated. If the alarm sequence is not cancelled, then security measures for protecting sensitive data on the computer system from unauthorized access may be executed. The security measures may include removing data or rendering a storage device inaccessible.

17 Claims, 7 Drawing Sheets

SYSTEM AND METHOD FOR SECURING A COMPUTER SYSTEM

BACKGROUND OF THE INVENTION

The present disclosure relates generally to securing computer systems, and more particularly, to securing data in portable computer systems.

Computer systems storing extremely sensitive or highly proprietary data are especially subject to loss or theft, and therefore represent a unique risk to their owners. Unauthorized access to information stored in a portable computer is facilitated by the ease of taking physical possession of the entire computer system, since such devices are often compact and lightweight. Portable laptop computers are widely used while traveling, which also exposes the data stored on such systems to a much greater risk of inappropriate dissemination. Many existing methods of securing computers leave their stored data vulnerable to unauthorized access.

Many methods of securing computer systems are focused on preventing unauthorized access. However, some computer systems store sensitive data that could cause substantial harm if inappropriately disseminated. Security methods for preventing unauthorized access, such as a system login or network security measures, are ineffective for protecting data stored on a storage device that can be physically removed, and easily accessed from another computer.

Some examples of "sensitive data" include government records, financial information for a large number of individuals acquired by business entities, personal health records, classified military secrets or other national security information, etc. The outright theft or unauthorized physical possession of computer systems storing such sensitive data represents a substantial security risk.

One example of such computer systems are portable computers, such as fully-functional laptop computers, for which the security risks are magnified. Portable computer systems are subject to a greater risk of loss or theft due to their great mobility and from being used during travel by their users. The sensitive data stored on laptop computers is often a copy of the data for use in the field.

BRIEF SUMMARY OF THE INVENTION

The present invention provides improved techniques for securing data stored on a computer system. In one embodiment, an alarm sequence is activated in response to detecting a security breach of the computer system, and if the alarm sequence is not deactivated within a first time period, the alarm sequence is completed. The alarm sequence includes rendering at least a portion of data stored on the computer system unreadable. The computer system may be a portable computer system. The security breach may be a physical movement of the computer system.

The alarm sequence may be deactivated during the first time period. The deactivating may be performed in response to receiving a deactivation message from a user of the computer system.

In some embodiments, the alarm sequence further includes generating an audio alarm emanating from the computer system, and sending an alarm message to a user of the computer system. Sending an alarm message may further include sending instructions for deactivating the alarm sequence. The computer system may be configured to send and receive wireless communications from a user of the computer system. In some embodiments, the alarm sequence includes reformatting a logical volume physically coupled to the computer system.

In one embodiment, a computer system is configured to secure stored data. The computer system includes a processor, a communication interface for communicating between the computer system and an authorized user of said computer system, a data storage device, an intrusion detection module, and a computer-readable medium accessible to the processor, storing executable program instructions. In response to unauthorized intrusion of the computer system, the instructions may be executed to initiate an alarm sequence, and if the alarm sequence is not terminated by the authorized user, the alarm sequence may be completed. The alarm sequence includes instructions executable to remove at least some data stored on the data storage device.

The instructions to complete the alarm sequence may be executed after a first time period has elapsed. The first time period may begin after the alarm sequence is initiated. The computer system may further include a power lock, while the instructions may further be executed to use the power lock to lock the power supply when the alarm sequence is initiated. The instructions may further be executed to specify a portion of data stored on the data storage device for removal according to the alarm sequence. The specified portion of data may be one or more data files stored under a logical volume installed on the data storage device, or a logical address space configured on the data storage device.

In one embodiment, the communications interface is configured for wireless communications. The computer system may be a portable computer system, while the intrusion detection module may be responsive to motion of the computer system. In some embodiments, a photovoltaic power source is further coupled to the computer system. The photovoltaic power source may be configured to provide power to at least the communication interface These and other advantages of the methods and systems described herein will be apparent to those of ordinary skill in the art by reference to the following detailed description and the accompanying drawings.

DETAILED DESCRIPTION

The methods and systems described herein provide a solution for securing computer systems, and in particular, for preventing unauthorized access to sensitive data stored on a storage device. As will be described in detail below, an alarm monitor may detect a security breach, such as a physical intrusion, and in response, may render sensitive data inaccessible. It is noted that while exemplary reference is made to portable computer systems, the techniques described herein may also be implemented on different kinds of computer systems. In some embodiments, the techniques described herein are usable on desktop systems, which are not designed for portable use and which may be physically secured to a fixed location.

Figure 1:
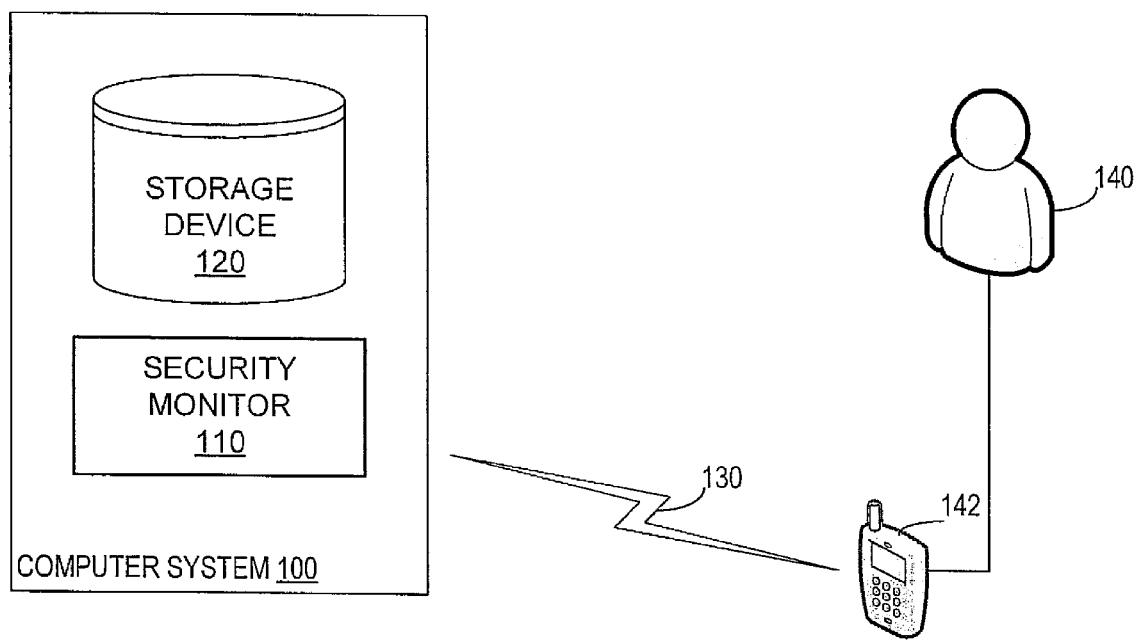
FIG. 1 is a diagram showing one embodiment of a system for securing data stored on a computer system.

Turning now to FIG. 1, one embodiment of a system for securing data is illustrated in diagram form. Computer system 100 represents either a portable or fixed computer system, including storage device 120, which stores sensitive data (not shown in FIG. 1). Computer system 100 is also equipped with security monitor 110, which may encompass both hardware and software elements, as described in further detail herein.

Storage device 120 may be a hard disk or other storage device to which computer 100 has access. In some cases, storage device 120 is an external, removable storage device that is coupled to computer system 100. Storage device 120 may further represent writable storage media, such as a Digital Versatile Disk "DVD" or writable compact disk "CD" that is located in a corresponding drive installed on computer system 100. In some implementations, sensitive data on storage device 120 is stored under one or more logical volume(s), for example, as files in a file system. In some embodiments, sensitive data may be stored on a combination of physical and logical drives configured on computer system 100, which are represented by storage device 120.

Security monitor 110, as mentioned above, may include both hardware and software components. As will be described in detail below, security monitor 110 may include a security device for detecting intrusion and locking down computer system 100. Security monitor 110 may further access or include a communications interface. Security monitor 110 may further include processor executable instructions, or code, for performing at least a portion of the methods described herein (for example the steps shown in FIGS. 4-6) for securing sensitive data on computer system 100. In some embodiments, security monitor 110 includes a wireless communications interface.

As shown in FIG. 1, user 140 is an authorized user of computer system 100. In some embodiments, user 140 is locally registered with a user account on computer system 100. As described herein, user 140 is the entity responsible for the sensitive data on computer system 100, and may operate security monitor 110 to secure the sensitive data. Security monitor 110 may be configured to communicate with user 140 using a communications interface, such as a wireless interface, for performing messaging and functions related to securing the sensitive data. Although user 140 is referred to in the singular, in some embodiments, user 140 may collectively represent a group of users that share responsibility for the sensitive data.

In FIG. 1, user 140 is shown being in possession of wireless communications device 142, which may be a mobile telephone or other wireless device. Device 142 may be configured for wireless messaging, such as email, text messaging, Short Message Service "SMS", Internet-access, voice messaging, instant messaging, video messaging, etc. Device 142 may be configured to operate using one or more wireless networks (not shown in FIG. 1) under the responsibility and ownership of user 140, or an entity related to user 140. In some cases, device 142 is a cellular telephone and supports common wireless interfaces such as the Global System for Mobile Communications "GSM" networks, Code Division Multiple Access "CDMA" networks, IEEE802.11 WiFi networks, IEEE802.16 WiMax networks, and other wireless networks.

Wireless link 130, according to FIG. 1, thus, represents a communications channel between wireless device 142 and security monitor 110, or in a broader sense, between user 140 and computer system 100. The wireless link 130 may be bidirectional and its establishment may be monitored either by device 142 or security monitor 110 or both. Wireless link 130 may be comprised of multiple wireless or wired segments, depending on the location of user 140 and computer system 100. For example, wireless link 130 may comprise a WiFi segment that bridges to a fixed network that, in turn, bridges to a cellular network. In some embodiments, security monitor 110 is configured to select from available wireless networks for connection, depending on various criteria, such as power, signal strength, bandwidth, latency, cost, encryption, etc.

Figure 2:
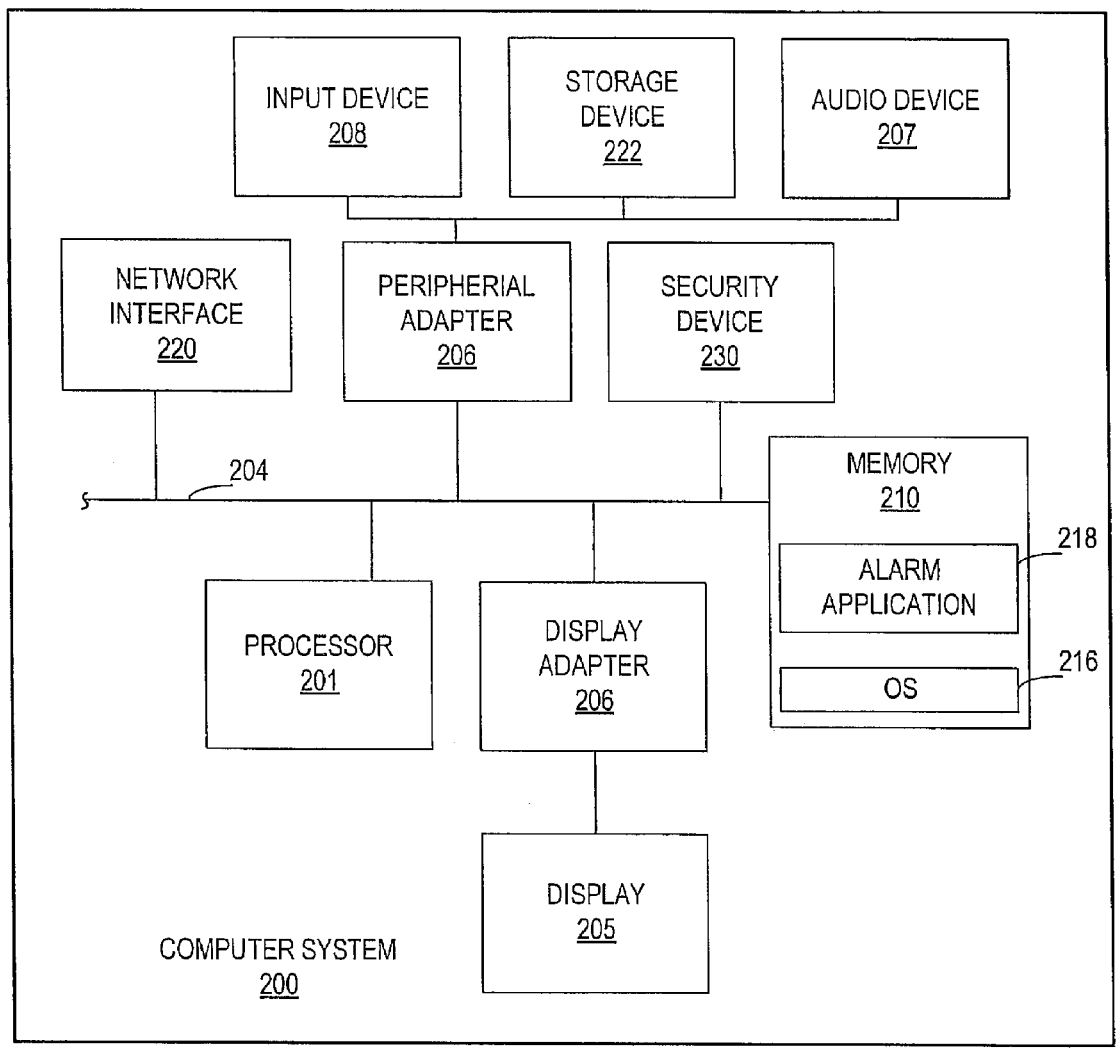
FIG. 2 is a block diagram of one embodiment of a computer system.

Referring now to FIG. 2, one embodiment of a computer system 200 is depicted in diagram form. In some embodiments, computer system 200 is an example configuration for computer system 100 in FIG. 1. In the embodiment depicted in FIG. 2, system 200 includes processor 201 coupled via shared bus 204 to a storage medium identified as memory 210.

Computer system 200, as depicted in FIG. 2, further includes network interface 220 that interfaces system 200 to a network (not shown in FIG. 2). Network interface 220 may be an adapter for a wireless or fixed-network. In the case of a fixed network, such as Ethernet, the adapter may be configured to accept galvanic or optical network media connectors. In embodiments suitable for use with the methods described herein, system 200, as depicted in FIG. 2, may include peripheral adapter 206, which provides connectivity for the use of input device 208, storage device 222, and audio device 207, such as a loudspeaker. In some embodiments, storage device 222 is an example of storage device 120 in FIG. 1.

Memory 210 encompasses persistent and volatile media, fixed and removable media, and magnetic and semiconductor media. Memory 210 is operable to store instructions, data, or both. Memory 210 as shown includes sets or sequences of instructions, namely, an operating system 216, and an alarm application program identified as 218. Operating system 216 may be a LINUX or LINUX-like operating system, an MS-Windows family operating system, or another suitable operating system.

As shown in FIG. 2, computer system 200 may include display adapter 206 for providing output to a display device 205. Display device 205 may be a liquid-crystal display (LCD) or similar display configured for use with operating system 216. In some embodiments, display device 205 is not physically housed together with computer system 200, but is a separate stand-alone device.

In conjunction with alarm application 218, security device 230 in FIG. 2 may comprise the elements of one embodiment of a security monitor, such as security monitor 110 described above with respect to FIG. 1. In one embodiment, the security monitor accesses network interface 220 for communicating with user 140. The security monitor may also access storage device 222 for securing data stored thereon. Further, the security monitor may respond to input device 208 and provide signals for output to audio device 207.

Security device 230 is further discussed with respect to the separate embodiments depicted in FIGS. 3A and 3B below. In one embodiment (see FIG. 3A), security monitor 230 includes an embedded processing device and is configured for executing instructions independent of processor 201. In another embodiment (see FIG. 3B), security monitor 230 may rely on processor 201 for executing instructions, and includes peripheral devices coupled to processor 201.

Figure 3A:
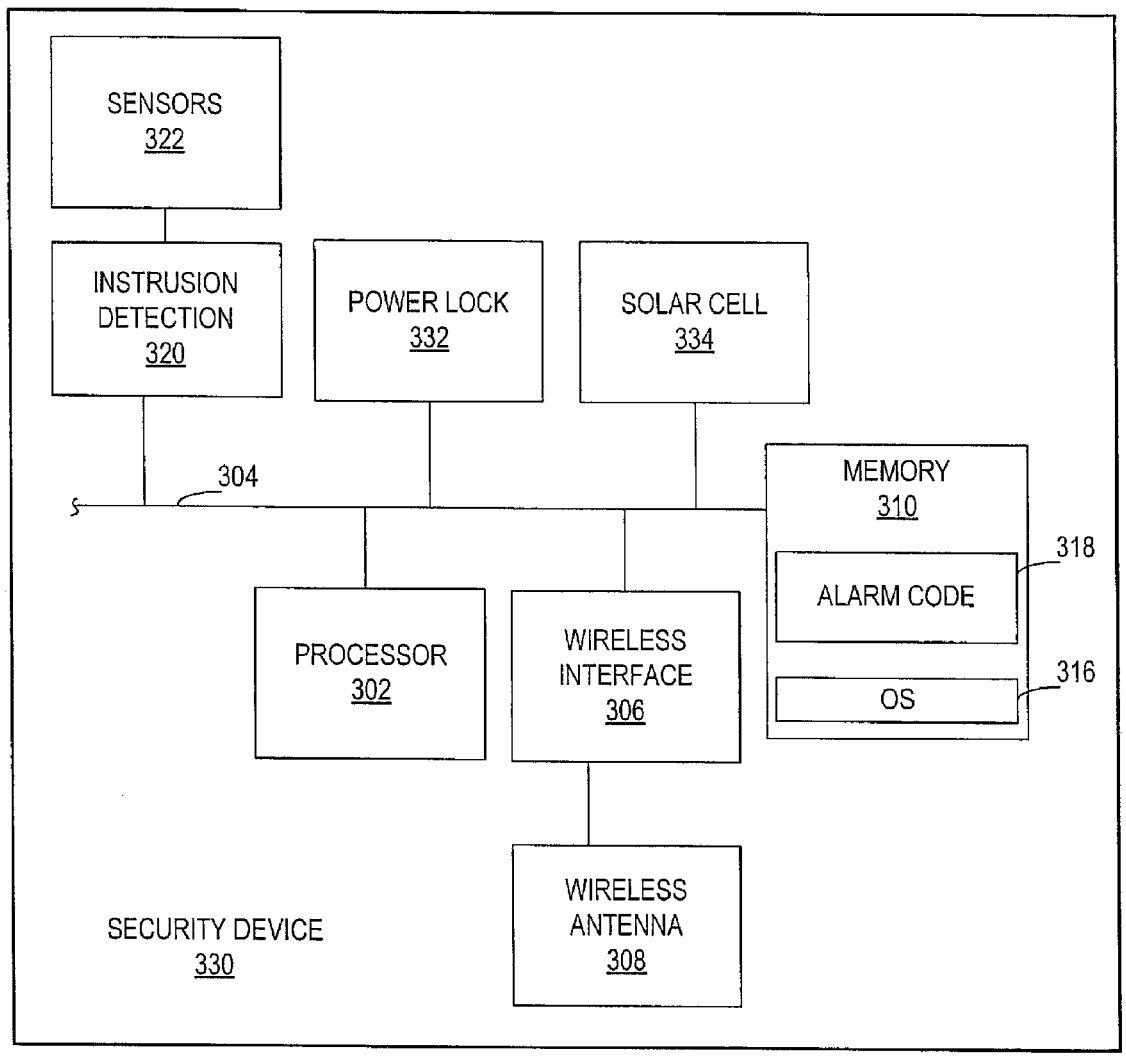
FIG. 3A is a block diagram of one embodiment of a security device.

Referring now to FIG. 3A, one embodiment of security device 330 is shown in diagram form. Security device 330 is a representative example of one embodiment of security device 230 shown in FIG. 2. In the embodiment depicted in FIG. 3A, security device 330 includes a secondary computing device, processor 302, in addition to processor 201 shown in FIG. 2. As such, security device 330 includes processor 302 coupled via shared bus 304 to a storage medium identified as memory 310.

Security device 330, as depicted in FIG. 3A, further includes wireless interface 306 that interfaces security device 330 to a wireless network (not shown in FIG. 2) using wireless antenna 308. In some embodiments, antenna 308 is integrated in security device 330, while in some cases, it may represent an external antenna.

Memory 310 encompasses persistent and volatile media, fixed and removable media, and magnetic and semiconductor media. Memory 310 is operable to store instructions, data, or both. Memory 310 as shown includes sets or sequences of instructions, namely, an operating system 316 and alarm code identified as 318. Operating system 316 may be any suitable operating system, such as an embedded processing operating system. Alarm code 318 may be configured to control the hardware elements in device 330, and may operate in conjunction with alarm application 218 (see FIG. 2) to enable security monitoring, as described herein.

As shown in FIG. 3A, security device 330 may further include an intrusion detection unit 320, which receives information from sensors 322 to detect a security breach. In some cases sensors 322 are motion sensors physically located on security device 330, and a security breach, or an unauthorized intrusion, is detected by intrusion detection unit 320 by detecting motion. In some instances, sensors 322 represent an interface for sensors external to security device 330, but which may be used by intrusion detection unit 320.

In FIG. 3A, security device 330 is further shown including power lock 332, which may represent actuators or a connection to one or more actuators. Power lock 332 may be configured to physically secure a component of a computer system, such as system 100 in FIG. 1, or system 200 in FIG. 2, from undesired access. In some embodiments, power lock 332 physically secures a battery compartment in a portable computer system. Also in FIG. 3A, security device 330 is shown with solar (or other photovoltaic cell) 334, which may provide additional or primary power for operating security device 330 or a component thereof. In one embodiment, solar cell 334 is installed on the outer surface of a portable computer and provides power for security monitoring, communications, and may recharge a primary battery of the computer (not shown).

Figure 3B:
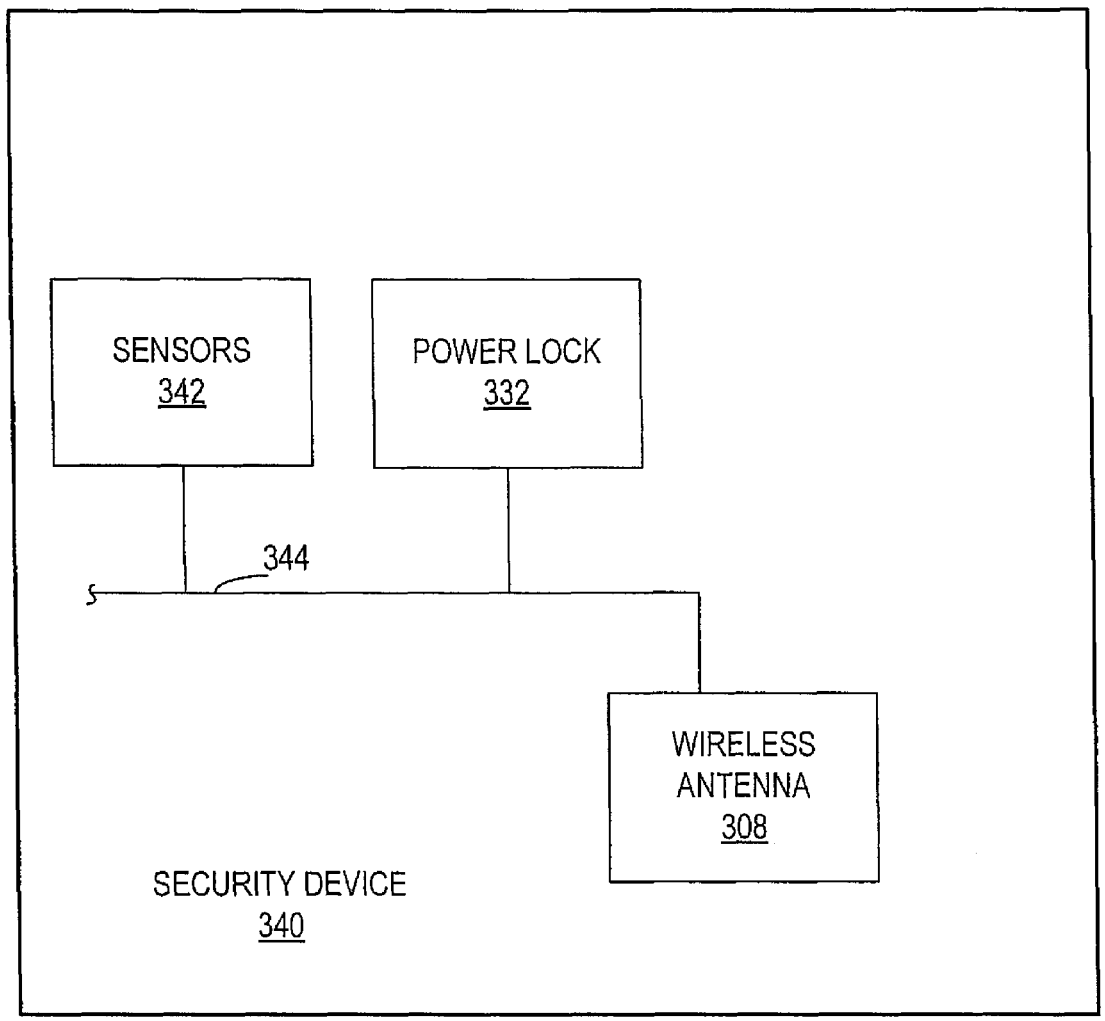
FIG. 3B is a block diagram of one embodiment of a security device.

Turning now to FIG. 3B, one embodiment of security device 340 is shown in diagram form. Security device 340 is a representative example of one embodiment of security device 230 shown in FIG. 2. In the embodiment depicted in FIG. 3B, security device 340 includes an internal bus 344, which may be coupled to shared bus 204 as shown in FIG. 2. Security device 340 relies on bus 344 to communicate with processor 201. As shown in FIG. 3B, instructions executed by processor 201, for example, alarm application 218, control operation of security device 340.

In some embodiments, bus 344 includes a secondary bus interface (not shown in FIG. 3B), which may provide additional instrumentation features, such as power connections, etc. Bus 344 may be configured for operation while computer system 200 is otherwise passive, for example, by independently drawing power from a power source. In one embodiment, security device 340 may interrupt processor 201 while computer system 200 is in sleep mode. Security device 340 may further include on or more sensors 342 for detecting a security breach. Sensors 342 may be motion sensors, similar to sensors 332 shown in FIG. 3A. Security device 340 is also shown with a power lock 332, as described above with respect to FIG. 3A. Security device 340, as depicted in FIG. 3B, further includes wireless antenna 308, which may serve as a transceiver to a wireless network (not shown). Antenna 308 enables security device 340 to communicate wirelessly, as described herein.

Figure 4:
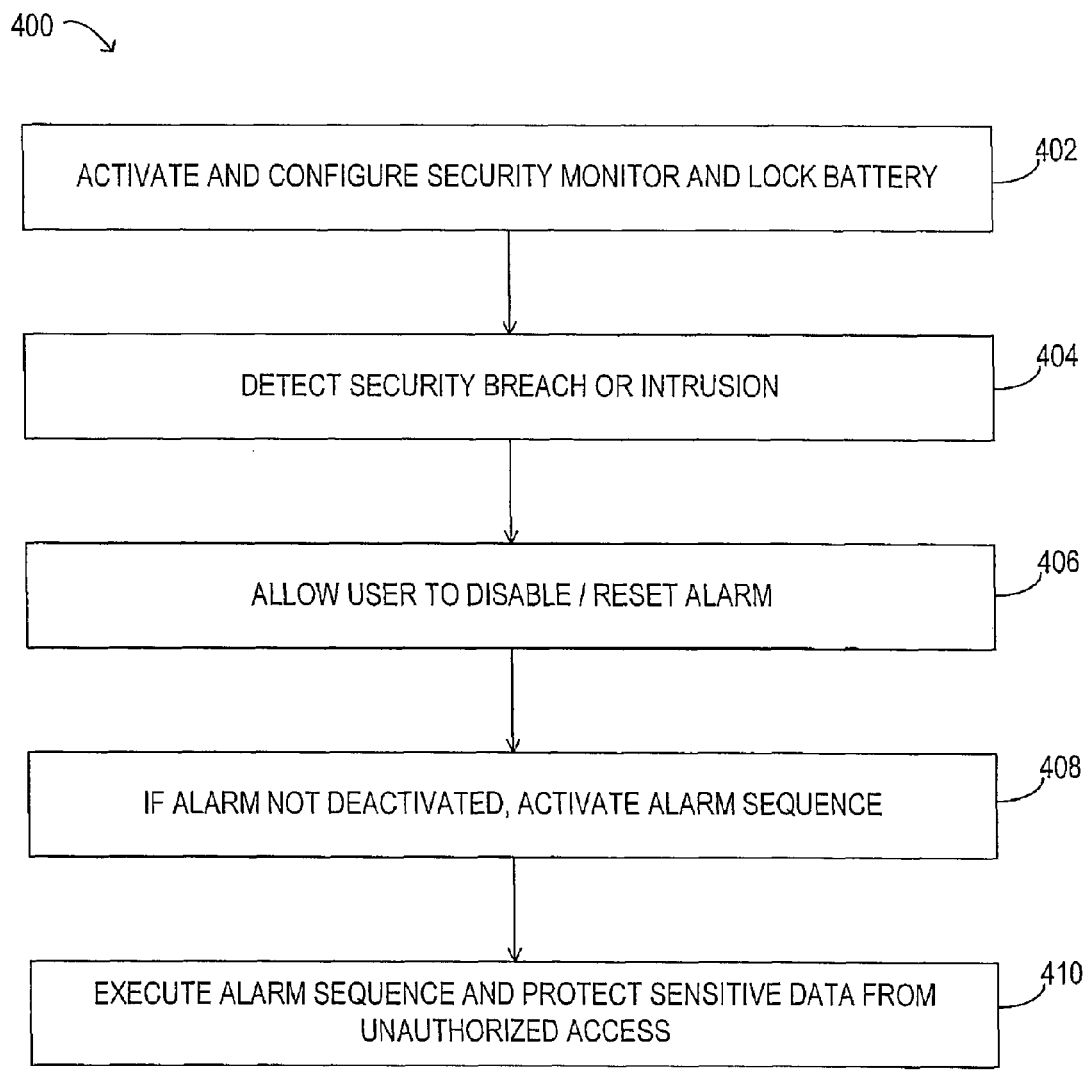
FIG. 4 is a flow chart depicting one embodiment of a method for security monitoring.

Advancing now to FIG. 4, one embodiment of a method 400 for security monitoring is shown in flow-chart form. It is noted that method 400 is executable by computer system 100 for securing sensitive data. In step 402, a security monitor on a computer system may be activated and configured. Configuring the security monitor in step 402 may include selecting data for securing, and entering parameters, such as those governing wait times, message addresses, audio and visual features, and/or other options. In one embodiment, activation of the security monitor in step 402 resets all values associated with monitoring and serves as an indication that all sensitive data on the computer system are presently secure. The security monitor may be activated in response to user input from an input device on the computer system, or by a message sent to the computer system.

Thus, security monitoring may be activated in step 402 via wireless or fixed networking from a remote location. Upon activating security monitoring, a battery, or other power source for computer system 100, may be locked in step 402. In one example, the battery compartment of a laptop computer may be locked. Step 402 may further include a delay, or activation timer interval, that delays the actual activation of security monitoring after the signal given by the user. In some cases, the user may disable activation of security monitoring during this time period that the activation timer is counting down. In some embodiments, the computer sends an activation message to the user confirming activation, or the start of the activation timer.

In step 404, security monitoring is active and is configured to detect a security breach, or intrusion of the computer system. As mentioned above, a movement of the computer system may be construed as a security breach in some instances. Other actions, such as the connection of a network cable, insertion of a peripheral device, use of removable storage media, or an attempt to connect via wireless network may also be construed as security breaches or unauthorized intrusions in certain implementations.

In step 404, the computer may send an alarm triggered message to the user upon detecting a security breach or intrusion, i.e., alarm triggered. In step 406, the user is allowed to disable or reset the alarm. An alarm trigger timer may be used to count down an interval after triggering, but prior to initiating an alarm sequence. Thus, step 406, may further include a delay, or alarm trigger interval, that delays starting the alarm sequence after the alarm is triggered. In some cases, the user may deactivate, or reset, the triggered alarm during the time period that the alarm trigger timer is counting down. In step 408, if the alarm has not been deactivated, then the alarm sequence is activated. In some cases, the alarm trigger timer must also elapse before the alarm sequence is activated. The user may also respond to the alarm triggered message by confirming the alarm sequence, or may desire to accelerate the alarm sequence, such that all further delays or timer countdown values are eliminated.

In step 410, the alarm sequence is executed and the user may be notified that the alarm sequence has been activated and is executing. In some embodiments, the alarm sequence includes an audio alarm that is generated by the computer system when the alarm sequence is active and executing. In step 410, an alarm timer may be used to count down an interval during the alarm sequence, such that step 410, may further include a delay, or alarm interval, that delays completing the alarm sequence. In some cases, the user may cancel the alarm during the time period that the alarm timer is counting down. If the user does not cancel the alarm, then the alarm timer will elapse and an action to protect sensitive data from unauthorized access with be executed.

As discussed above, the action to protect sensitive data in step 410 may include an action that deletes or removes at least a portion of the data on a storage device accessible to the computer system. Deletion or removal may include overwriting of previous data with new data, such that the previous data are no longer present and are not retrievable. In some embodiments, the action includes reformatting a logical volume attached to the computer system. The reformatting may specify overwriting of all sectors on the logical volume. In some embodiments, certain selected sections or files are reformatted. In some embodiments, the action may result in physical or logical destruction of at least a portion of the storage device. In certain instances, the action is limited to a selected physical or logical location on the logical volume, such as a collection of sectors or certain selected files and directories. The action may result in sensitive data being irreversibly rendered inaccessible.

Figure 5:
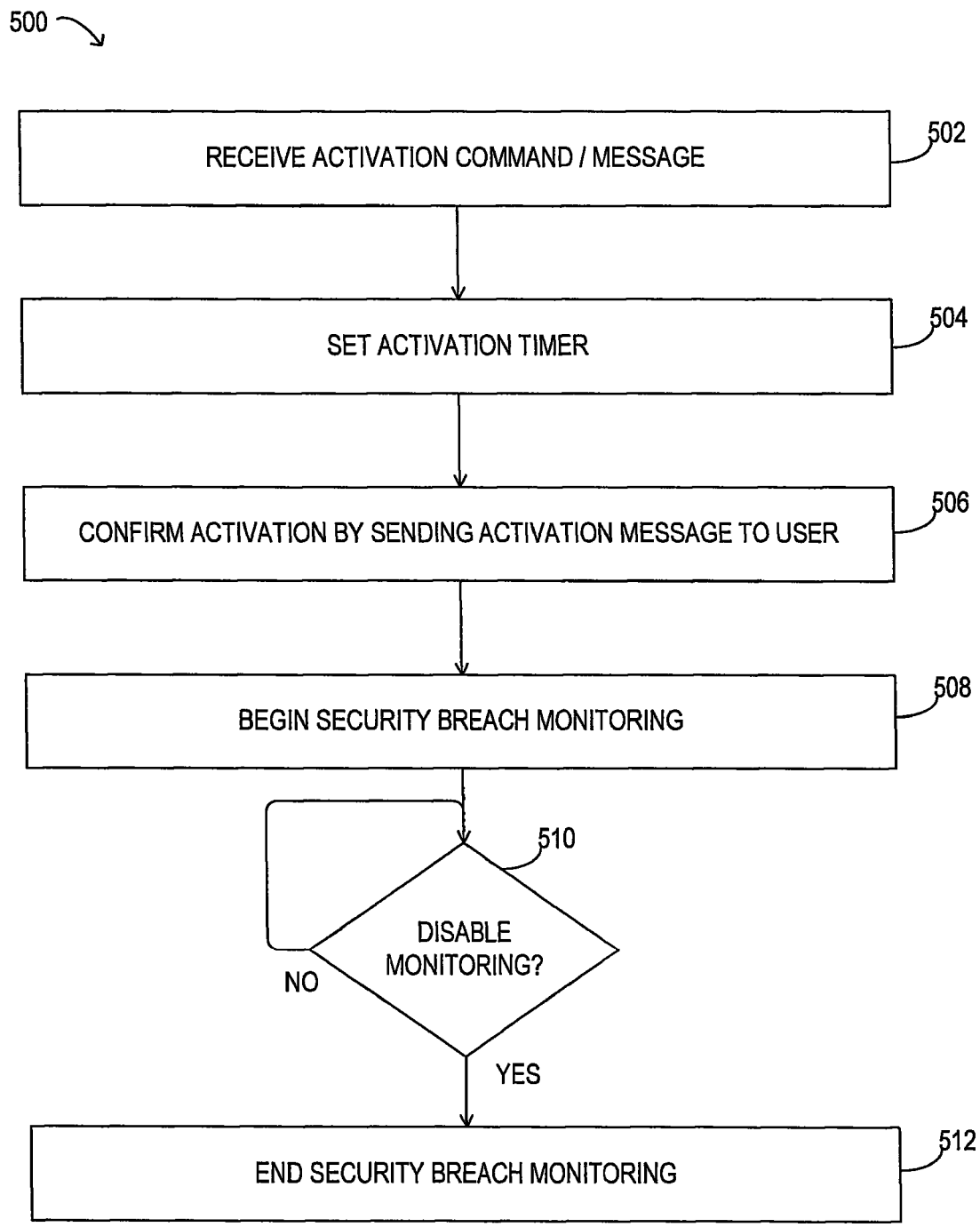
FIG. 5 is a flow chart depicting one embodiment of a method for activating a security monitor.

Turning now to FIG. 5, one embodiment of a method 500 for activating security monitoring is shown in flow-chart form. Method 500 may represent one embodiment of certain elements in method 400. For example, steps 502-508 in FIG. 5 may represent step 402 in FIG. 4, and step 510 in FIG. 5 may be performed while step 404 in FIG. 4 is in progress. In step 502, the activation command or message is received by the user. The command may be received in step 502 via a user input device on the computer system, or via fixed or wireless network, as discussed above. In step 504, the activation timer is set according to a user-specified value and started. In step 506, the activation is confirmed by sending an activation message to the user. In some embodiments, the activation message includes one or more timer values, or other parameters currently being used for security monitoring. In step 508, security breach monitoring begins, and waits for the detection of an intrusion or other breach event. In step 510, monitoring continues until a decision has been made whether or not monitoring has been disabled. If the answer to step 510 is NO, then step 510 continues. If the answer to step 510 is YES, then step 512 is executed, which ends security breach monitoring. It is noted that step 510 may be executed concurrently with other methods described herein.

Figure 6:
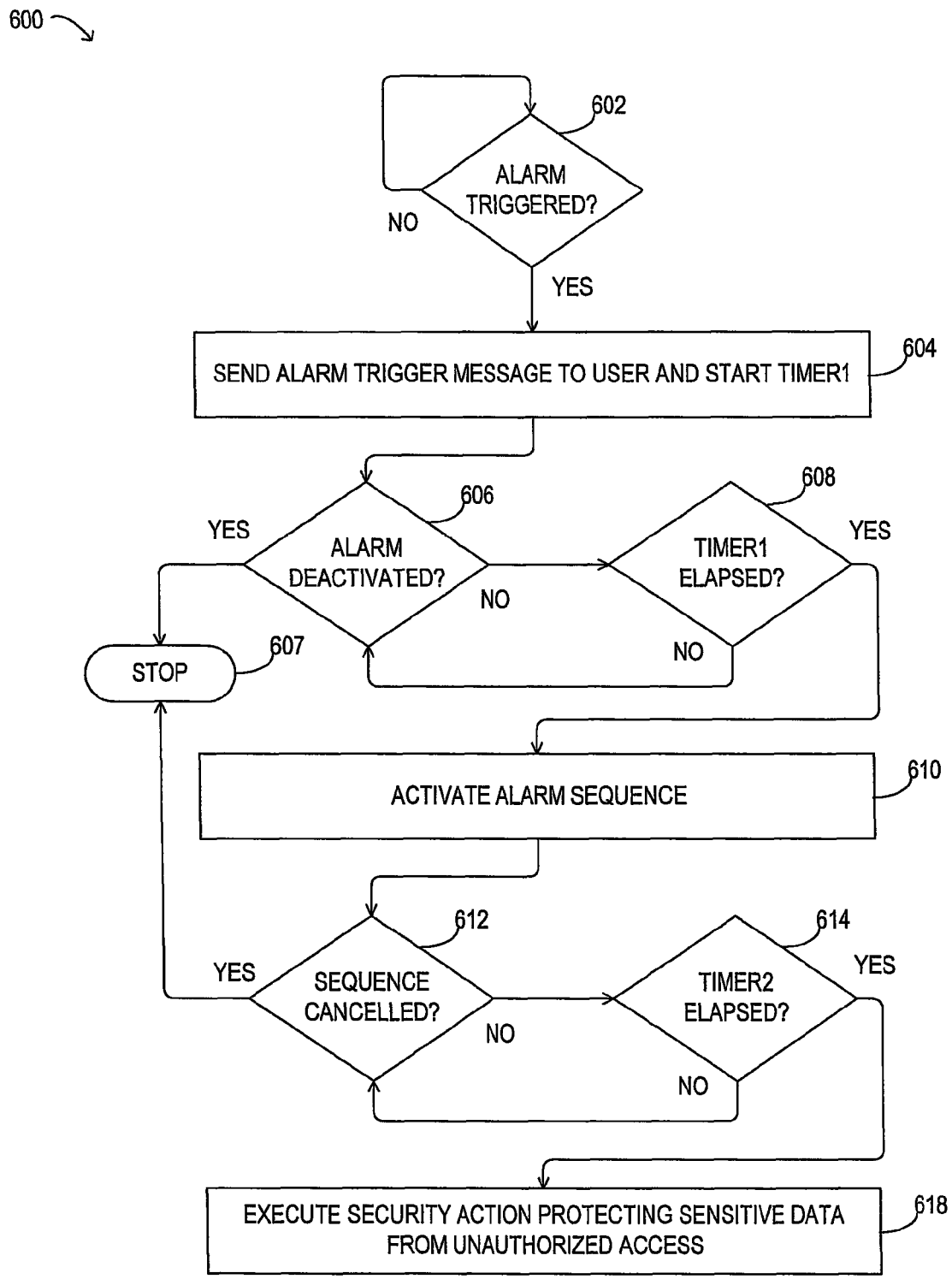
FIG. 6 is a flow chart depicting one embodiment of a method for executing an alarm sequence.

Moving on to FIG. 6, one embodiment of a method 600 for executing an alarm sequence is depicted in flow-chart form. In step 602, a decision is made whether an alarm has been triggered or not. If the result of step 602 is NO, then step 602 repeats. If the result of step 602 is YES, then the method advances to step 604, where an alarm trigger message is sent to the user and the alarm trigger time, denoted timer1 in method 600, is started. In step 606, a decision is made whether the alarm has been deactivated, for example, by the user. If the result in step 606 is YES, then method 600 terminates at step 607. If the result in step 606 is NO, then a decision is made in step 608 whether or not timer1 has elapsed. If the result of step 608 is NO, then the method returns to step 606. If the result of step 608 is YES, then the alarm sequence is activated in step 610.

In step 612, a decision is made whether the alarm sequence has been canceled, for example, by the user. If the decision in step 612 is YES, then method 600 terminates at step 607. If the decision in step 612 is NO, then a decision is made in step 614, whether or not timer2 (alarm timer) has elapsed. If the result of step 614 is NO, then the method returns to step 612. If the result of step 614 is YES, then in step 618, a security action protecting sensitive data from unauthorized access is performed. In some cases, step 618 is comparable to the actions described above with respect to step 410 in FIG. 4. It is noted that the alarm sequence is not limited to the embodiments described with respect to method 600, but may include additional actions, tasks, and communications, as desired.

The foregoing Detailed Description is to be understood as being in every respect illustrative and exemplary, but not restrictive, and the scope of the embodiments disclosed herein is not to be determined from the Detailed Description, but rather from the claims as interpreted according to the full breadth permitted by the patent laws. It is to be understood that the embodiments shown and described herein are only illustrative principles and that various modifications may be implemented by those skilled in the art without departing from the scope and spirit of the methods described herein. Those skilled in the art could implement various other feature combinations without departing from the scope and spirit of the disclosed embodiments.

The invention claimed is:

1. A method for securing data stored on a logical volume of a portable computer system, comprising:
    configuring, at the portable computer system, a security monitor by selecting data for securing, and entering parameters, the parameters comprising wait times, message addresses, audio features and visual features;
    activating, via a wireless network, the security monitor in response to receiving user input via the wireless network;
    activating a power lock to lock a power supply of the portable computer system and secure the power supply from undesired access;
    determining an alarm has been triggered in response detecting a physical movement of the portable computer system;
    determining whether the alarm has been deactivated;
    if an alarm trigger time has elapsed and the alarm has not been deactivated, activating an alarm sequence in response to the detecting a physical movement of the portable computer system;
    generating an audio alarm, based on the alarm sequence;
    sending an alarm triggered message to a user of the portable computer system, wherein the alarm triggered message comprises a notification that the alarm sequence has been activated and an email comprising instructions for deactivating the alarm sequence;
    in response to receiving a response to the alarm triggered message confirming the alarm sequence by the user, accelerating the alarm sequence to eliminate further delays;
    if a deactivation message is received from the user during a first time period, deactivating the alarm sequence;
    if the alarm sequence is not cancelled within the first time period, determining whether a timer has elapsed; and
    if the timer has elapsed, completing the alarm sequence, wherein completing the alarm sequence comprises:
        reformatting the logical volume and overwriting all sectors of the logical volume to render all data stored on the portable computer system unreadable.

2. The method of claim 1, further comprising:
    receiving wireless communications from the user of the portable computer system via the wireless network.

3. The method of claim 1, wherein the activating the alarm sequence further comprises:
   transmitting a message via a wireless communications interface to a user, the message comprising a notification of an alarm condition.

4. A portable computer system to secure data stored on a logical volume, comprising:
   a processor;
   a communication interface for communicating between the computer portable system and an authorized user of the portable computer system;
   a data storage device;
   an intrusion detection module; and
   a memory to store computer program instructions, the computer program instructions when executed by the processor, cause the processor to perform operations comprising:
      configuring a security monitor by selecting data for securing, and entering parameters, the parameters comprising wait times, message addresses, audio features and visual features;
      activating, via a wireless network, the security monitor in response to receiving user input via the wireless network;
      activating a power lock to lock a power supply of the portable computer system and secure the power supply from undesired access;
      determining an alarm has been triggered in response detecting a physical movement of the portable computer system;
      determining whether the alarm has been deactivated;
      if an alarm trigger time has elapsed and the alarm has not been deactivated, initiating an alarm sequence in response to the detecting a physical movement of the portable computer system;
      generating an audio alarm, based on the alarm sequence;
      sending an alarm triggered message to the authorized user of the portable computer system, wherein the alarm triggered message comprises a notification that the alarm sequence has been activated and an email comprising instructions for deactivating the alarm sequence;
      in response to receiving a response to the alarm triggered message confirming the alarm sequence by the user, accelerating the alarm sequence to eliminate further delays;
      if a deactivation message is received from the user during a first time period, deactivating the alarm sequence;
      if the alarm sequence is not cancelled within the first time period, determining whether a timer has elapsed; and
      if the timer has elapsed, completing the alarm sequence, wherein completing the alarm sequence comprises:
         reformatting the logical volume and overwriting all sectors of the logical volume to render all data stored on the data storage device unreadable.

5. The portable computer system of claim 4, the operations further comprising:
   completing the alarm sequence after the first time period has elapsed, wherein the first time period begins after the alarm sequence is initiated.

6. The portable computer system of claim 4, the operations further comprising:
   specifying a portion of data stored on the data storage device for removal according to the alarm sequence.

7. The portable computer system of claim 6, wherein the specified portion of data comprises data files stored under a logical volume installed on the data storage device.

8. The portable computer system of claim 7, wherein the specified portion of data comprises a logical address space configured on the data storage device.

9. The portable computer system of claim 4, wherein the communications interface communicates wirelessly.

10. The portable computer system of claim 4, further comprising:
    a photovoltaic power source coupled to the portable computer system.

11. A non-transitory computer-readable medium storing program instructions, which, when executed on a processor, cause the processor to perform operations comprising:
    configuring a security monitor by selecting data for securing, and entering parameters, the parameters comprising wait times, message addresses, audio features and visual features
    activating, via a wireless network, the security monitor in response to receiving user input via the wireless network;
    activating a power lock to lock a power supply of the portable computer system and secure the power supply from undesired access;
    determining an alarm has been triggered in response detecting a physical movement of the portable computer system;
    determining whether the alarm has been deactivated;
    detecting a triggered alarm indicating physical movement of a portable computer system;
    if an alarm trigger time has elapsed and the alarm has not been deactivated, activating an alarm sequence in response to the detecting a physical movement of the portable computer system;
    executing an alarm sequence based on the triggered alarm after a first time period has elapsed;
    generating an audio alarm, based on the alarm sequence;
    sending an alarm triggered message to a user of the portable computer system, wherein the alarm triggered message comprises a notification that the alarm sequence has been activated and an email comprising instructions for deactivating the alarm sequence;
    in response to receiving a response to the alarm triggered message confirming the alarm sequence by the user, accelerating the alarm sequence to eliminate further delays;
    if a deactivation message is received from the user during the first time period, deactivating the alarm sequence; and
    if the alarm sequence is not cancelled by the user of the portable computer system prior to the elapse of a second time period, complete the alarm sequence, wherein the instructions to complete the alarm sequence are executable to reformat a particular logical volume of data stored on the portable computer system and overwrite all sectors of the logical volume to irreversibly render the data stored on the portable computer system inaccessible.

12. The non-transitory computer-readable medium storing program instructions of claim 11, the operations further comprising:
    formatting the data stored for rendering as irreversibly inaccessible.

13. The non-transitory computer-readable medium storing program instructions of claim 12, the method operations further comprising: in response to sending the alarm triggered message, receiving the deactivation message from the user.

14. The non-transitory computer-readable medium storing program instructions of claim 13, wherein the deactivation message indicates termination of the alarm sequence.

15. The non-transitory computer-readable medium storing program instructions of claim 13, the operations comprising:
 receiving a trigger message from the user, wherein the trigger message indicates a continuation of the alarm sequence.

16. The computer-readable medium storing program instructions of claim 11, the operations further comprising:
 exchanging messages between the user and the portable computer system using wireless communication.

17. A system for securing data stored on a logical volume of a computer system, comprising:
 a processor;
 a memory to store computer program instructions, the computer program instructions when executed on the processor cause the processor to perform operations comprising:
 configuring, at the portable computer system, a security monitor by selecting data for securing, and entering parameters, the parameters comprising wait times, message addresses, audio features and visual features
 activating, via a wireless network, the security monitor in response to receiving user input via the wireless network;
 activating a power lock to lock a power supply of the portable computer system and secure the power supply from undesired access;
 determining an alarm has been triggered in response detecting a physical movement of the portable computer system;
 determining whether the alarm has been deactivated;
 if the alarm trigger time has elapsed and the alarm has not been deactivated, activating an alarm sequence in response to detecting a physical movement of the portable computer system;
 generating an audio alarm, based on the alarm sequence;
 sending an alarm triggered message to a user of the portable computer system, wherein the alarm triggered message comprises a notification that the alarm sequence has been activated and an email comprising instructions for deactivating the alarm sequence;
 receiving a response to the alarm triggered message confirming the alarm sequence by the user;
 in response to the receiving a response to the alarm triggered message confirming the alarm sequence by the user, accelerating the alarm sequence to eliminate further delays;
 deactivating the alarm sequence, if a deactivation message is received from the user during a first time period;
 if the alarm sequence is not cancelled within the first time period, determining whether a timer has elapsed; and
 if the timer has elapsed, completing the alarm sequence if the alarm sequence is not deactivated within the first time period, wherein completing the alarm sequence comprises:
 reformatting the logical volume and overwriting all sectors of the logical volume to render all data stored on the portable computer system unreadable.

\* \* \* \* \*

UNITED STATES PATENT AND TRADEMARK OFFICE
CERTIFICATE OF CORRECTION

PATENT NO. : 8,685,110 B2  Page 1 of 1
APPLICATION NO. : 12/277746
DATED : April 1, 2014
INVENTOR(S) : John P. Dowens et al.

It is certified that error appears in the above-identified patent and that said Letters Patent is hereby corrected as shown below:

In the Claims

In claim 13, column 10, line 67, "program instructions of claim 12, the method" should read --program instructions of claim 11, the method;--.

Signed and Sealed this
Nineteenth Day of August, 2014

Michelle K. Lee
*Deputy Director of the United States Patent and Trademark Office*